Figure 1:
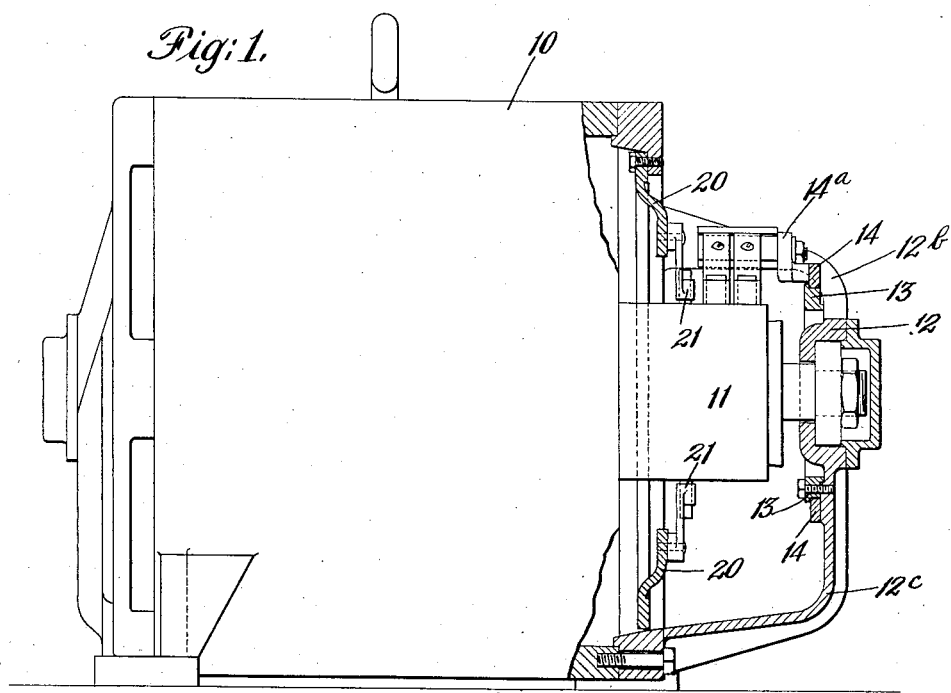

July 15, 1924.

J. BURKE

DYNAMO ELECTRIC MACHINE

Filed June 15, 1922

1,501,878

2 Sheets-Sheet 1

INVENTOR
James Burke
BY
Edwards, Sager & Power
his ATTORNEYS

Patented July 15, 1924.

1,501,878

UNITED STATES PATENT OFFICE.

JAMES BURKE, OF ERIE, PENNSYLVANIA, ASSIGNOR TO BURKE ELECTRIC COMPANY, A CORPORATION OF PENNSYLVANIA.

DYNAMO-ELECTRIC MACHINE.

Application filed June 15, 1922. Serial No. 568,421.

*To all whom it may concern:*

Be it known that I, JAMES BURKE, a citizen of the United States, residing at Erie, in the county of Erie and State of Pennsylvania, have invented certain new and useful Improvements in Dynamo-Electric Machines, of which the following is a specification.

This invention relates to dynamo electric machines or electric generators, which are particularly well adapted for use in electric arc welding, and for other uses wherein similar operating characteristics are required and where adjustment of the character of the output is desirable for adaptation to the different requirements of the work involved.

In electric arc welding, it is necessary, where the welding to be done is of a varied character and on different forms of material, to adjust the character of the output to the particular requirement; for example, the welding current for some classes of work may require a current of say 50 amperes for the best results, but for work of another character, the current may be say 200 amperes or more for best results. Intermediate current values may be desirable for other kinds of work, and the requirements are so variable and the welding operation is so sensitive to different current values, that it is very desirable to have not only a wide range of adjustment, but the capability of adjustment to a high degree of refinement. One prior method of securing adjustments of the welding current is to provide adjustable resistance devices in the main circuit but these are wasteful in the consumption of current; another method is to provide the field windings of the generator with a number of taps, or variable shunts for the windings, which cause undesirable variations in the control with small change of the load resistance. In these and similar prior methods of adjustment, objection arises not only from the necessity of auxiliary apparatus and auxiliary adjusting means, but they all have the objection that only a comparatively few steps of adjustment are obtainable and the circuit conditions are unstable with changes in the arc resistance.

One object of my invention is to provide an improved generator which is capable of securing an infinite number of adjustments of the welding current for different classes of work over a wide range. Another object is to accomplish this without any auxiliary controlling devices or auxiliary adjusting means. Another object is to avoid the necessity of an auxiliary exciter or outside source of current for exciting the field windings. Another object is the production of a generator which will be self regulating when adjusted for any particular welding current and will regulate in such a way as to fulfill the requirements for arc welding and obtain stable operating conditions. In striking the arc, the voltage should preferably be high enough to cause a current to flow, which will be somewhat greater when the welding electrode is brought in contact with the work, than the normal current required for the welding operation. As the arc is drawn and its resistance increased, the voltage generated should gradually increase to a value high enough to maintain the current at the required constant value when the resistance of the circuit is constant. With increase in arc resistance, the voltage should correspondingly increase, and with decrease in arc resistance, the voltage generated should correspondingly decrease, maintaining the current at a practically constant value best suited for welding in any particular instance, and with a slightly increasing value of current as the arc resistance decreases.

My improved machine accomplishes this result and is not only self-regulating to suit the requirements for any particular welding operation without the necessity of auxiliary devices, but is also adapted for obtaining different welding current values for different kinds of work by adjustment, without the use of auxiliary controlling means and also gives an infinite number of points of adjustment.

Another object of my invention is to provide means for securing good commutation without objectionable sparking at the brushes, under all the various positions of adjustment and under all operating conditions.

My invention will be understood by reference to the accompanying drawings and the following description which discloses a preferred embodiment of my invention.

Figure 2:
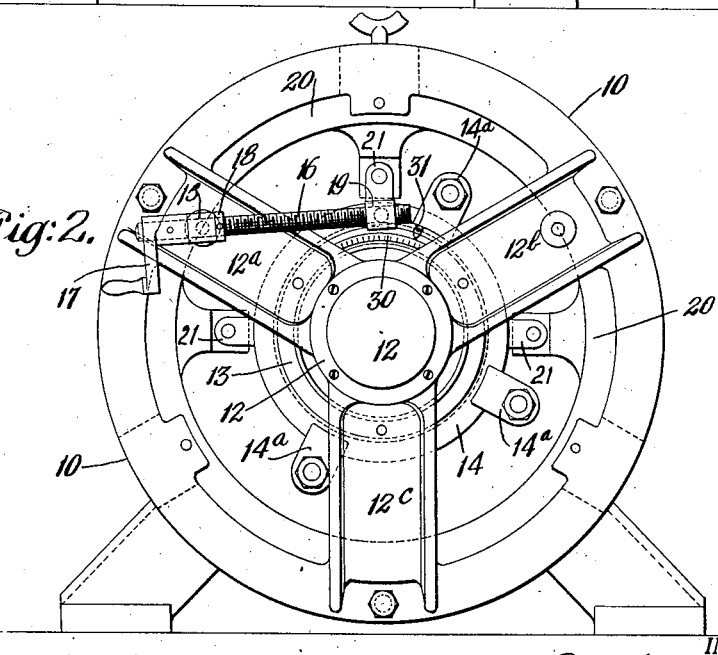
Figure 3:
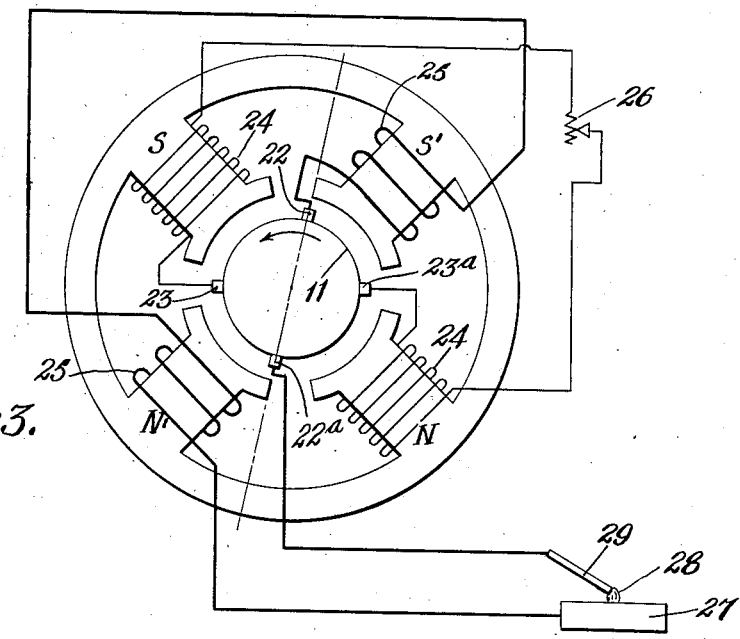
Figure 4:
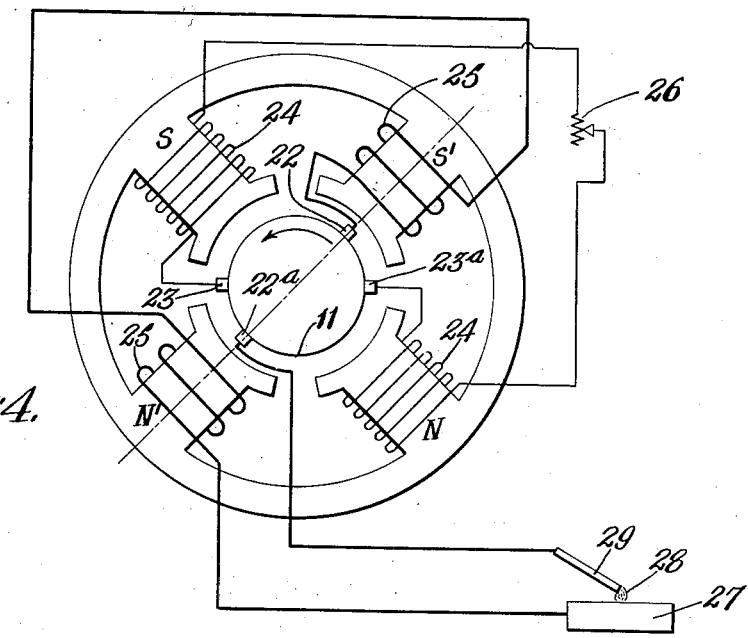

Fig. 1 is a side view partly in section of my improved generator showing particularly the adjustable support for the main brushes and the support for the exciter brushes; Fig. 2 is an end view of the machine; Fig. 3 is a diagram showing the field poles and windings and brush positions for one condition of operation; and Fig. 4 is a similar diagram with the main brushes adjusted to a different position.

The dynamo is adapted to be driven at substantially constant speed by an electric motor, or other source. The generator frame is shown at 10 and if desired the driving motor may be included within the main frame so as to secure for convenience a unitary motor generator. The commutator of the generator is shown at 11 and the end bearing bracket at 12, which latter is shown as having three arms 12$^a$, 12$^b$, 12$^c$ and is secured to the main frame of the machine as shown. On the inner face of the end brackets is bolted a ring 13, which provides a circumferential groove in which is journalled an adjustable brush carrying ring 14. This brush ring has such number of brackets 14$^a$, as may be required by the number of poles in the machine, for carrying the main brushes. On one of the arms 12$^a$ is pivotally mounted a sleeve 15 through which freely passes a threaded rod 16. At one end of the rod is fixed a handle 17, the sleeve of which engages one side of the sleeve 15; and at the other side thereof is fixed a collar 18. The rod 16 is therefore free to turn in the sleeve 15 without longitudinal movement. The threaded end of the rod 16 engages a nut 19 which is pivotally mounted on the outside face of the brush bracket 14. Evidently turning the handle 17 will cause the main brushes of the machine to be adjusted over a wide range and to any desired point, giving an infinite number of points of adjustment to suit the particular requirements of the work. A suitable scale plate 30 is fixed to the end bracket and a pointer 31 is carried by the brush ring 14 so as to move over the scale plate as the brush ring is adjusted. The scale plate may be marked after calibration, to indicate the current values obtained with the different positions of adjustment.

On the inner end of the end bracket 12 is secured another brush bracket 20, to which are secured brush holders 21 for carrying the exciter brushes. The various positions of the main brushes and the position of the exciter brushes in relation to each other and to the poles will be explained in conection with Figures 3 and 4, but it is evident from the above that the exciter brushes can be fixed in a given position and that the main brushes may be adjusted to any desired position over a wide range. In this particular machine the range of angular adjustment of the main brushes is sufficient for an eight pole machine, which was the number of poles used in the particular machine disclosed. For convenience and simplicity of explanation, a four pole machine is indicated in Figs. 3 and 4.

Referring to these latter figures, the commutator of the armature is indicated at 11 and the main brushes bearing thereon are indicated at 22, 22$^a$, and the auxiliary brushes bearing thereon are indicated at 23, 23$^a$. The field frame is shown as having four poles of the same size, the two poles N, S, having a shunt winding 24 and the two poles N′, S′, having a series winding 25. The shunt pole S and the series pole S′ are adjacent and have the same polarity as each other and the shunt pole N and the series pole N′ are adjacent and have the same polarity as each other and are of opposite polarity to the other two poles. The shunt windings 24 are connected in circuit with the exciter brushes 23, 23$^a$, an adjustable resistance 26 being provided in the shunt circuit if desired for adjustment of the shunt field current to a desired amount. The series windings are connected in series with the main brushes, the circuit extending from main brush 22 through the series windings and thence to the work to be welded 27, and then through the arc 28 and welding electrode 29 to the other main brush 22$^a$. The series poles are unsaturated and excited in a direction to oppose the poles of the armature; the shunt poles are preferably unsaturated giving better operating results with a changeable magnetization than with the poles saturated and a constant strength, although sufficiently satisfactory results can sometimes be obtained when the shunt poles are maintained at constant strength. In the following, for simplicity of explanation, the brushes are assumed to be positioned in the line of communication of the armature coils instead of being displaced 90 electrical degrees therefrom, as is done in practice for convenience in arrangement of the end connections of the armature coils. Thus in practice the brush positions will usually be 90 electrical degrees from the positions herein considered, but the operation and reactions will be the same.

The exciter brushes 23, 23$^a$, will be fixed in position during all conditions of operation and are located at or near the neutral points of the armature so that under all conditions the maximum voltage generated by the armature is utilized for excitation of the shunt winding. Thus as shown in Figs. 3 and 4, the shunt circuit is subjected to the voltage generated by the armature conductors under the influence of the combined effect of the poles S S′ on one-half of the armature and likewise the influence of the combined effect of the poles N′, N on the other half of the armature, these two influences being at all times substantially equal to each other, but variable under different conditions of operation.

In Fig. 3 the main brushes are shown located on the line of commutation which in the position of adjustment shown is at about the edge of the series poles S', N'. In this position the welding current delivered from the machine will have one of the lower values of welding current and in operation this lower value of welding current will be due to the following conditions. For example, the series winding will be assumed proportioned to cause the field due to the series pole to be somewhat greater in value than the field due to the armature and in opposition thereto. But in the position shown, the armature field has its maximum strength on the line of the main brushes, which in the position of Fig. 3 is at the edge of the series poles. Consequently the resultant flux to which the armature conductors are subjected from main brush to main brush, will be that due to the difference between the resultant field under one series pole S' and under one shunt pole N, and likewise on the other side of the armature will be due to the difference between the fields under the series pole N' and the shunt pole S.

Considering the effect under the series pole S' and shunt pole N, we can determine the voltage generated by the armature between the main brushes by considering the condition under each of the poles separately. Taking the series pole S' the field strength thereof is decreased by the effect of the armature field by its maximum strength being at one edge of the series pole and decreasing across the face of the pole to a small value at the other edge of the series pole. Thus at the edge where the brush is located the series field is reduced by the maximum strength of the armature field, giving a small resultant field at this point due to the small excess strength of the series field. At the other edge of pole S' the full series field strength is reduced only slightly by the armature field, so that at that edge of the pole there will be a very much stronger resultant field. Between the two edges of the series pole S', there will be a gradation of resultant field strength between the two limits, giving an average resultant field of about half the series field strength. Considering the field of the shunt pole N, at the upper edge of this pole the shunt field strength will have approximately its full value, because the opposing strength of the armature field at this point is comparatively small. At the lower edge of the shunt pole N, the field of the shunt pole will be much reduced by nearly the full strength of the armature field. The result is that the resultant field under the shunt pole end will decrease from nearly the full strength of the shunt field at the upper edge to a comparatively small value of the excess shunt field strength at the lower edge. If we assume that the field created by the series winding and that by the shunt winding are about equal in this condition, and since the field of the shunt pole is reduced to a less extent by the armature field than the field due to the series pole in the position selected, the average value of the resultant field under the shunt pole will be a comparatively small amount in excess of the value of the average field under the series pole. The voltage generated in the armature will be due to the difference of these average fields. A similar effect obviously occurs on the other half of the armature. The resultant effect is that the voltage generated by the armature between the main brushes is comparatively small. Thus the current delivered through the load circuit and arc by the voltage generated will be at a relatively small value for this position of the main brushes.

The generator will also be self regulating to maintain this current at a substantially constant value for working circuit conditions, causing the voltage generated to increase as the resistance of the arc increases and causing the voltage to decrease as the resistance of the arc decreases, as will be understood from the following. Assuming that the resistance of the arc has been decreased, this tends to cause an increase in the strength of the current from the normal working amount. A small increase in current will however, cause a comparatively large decrease in the voltage generated because the average field strength under the series pole will be increased and the average field strength under the shunt pole decreased, causing the difference between these average values to be much less and consequently the voltage generated between the main brushes to be much less. For example, a 5% increase in the main current will increase the field created by the series pole to a little greater extent than the field created by the armature, because the former being stronger than the latter, the quantitative increase in the former is greater than the latter, causing the resultant average field under the series pole to be increased. As regards the shunt pole, the field created by the shunt pole will remain substantially the same as before, but the 5% increase in the armature field will cause the resultant average field under the shunt pole to be decreased, and since the average field under the series pole is increased and the average field under the shunt pole decreased by the assumed 5% increase in the main current, the difference between these resultant average fields will be much less than before the increased current, thus giving a much smaller voltage at the main brushes. A further small increase in current similarly causes a comparatively large decrease in voltage at the main brushes. Similarly a small decrease in the value of the current gives a comparatively large increase in voltage generated which gives the self regulation desired by control of the voltage generated so as to keep the current change within small limits. When the welding electrode is in direct contact with the work, it will be seen that the tendency to produce a large current is checked by reduction of the voltage generated in the manner described so that even with this condition the current is only a small amount larger than is the case under the normal welding operation.

The direction of rotation of the armature, viewed from the commutator end, with the brushes in the position indicated in Fig. 3, is indicated by the arrow. If it be desired to adjust the machine to a condition which will deliver a larger value of welding current for a different welding requirement of the work, the main brushes will be moved backward from the position shown in Fig. 3. In general this tends to cause the armature field to more effectively oppose the field created by the series pole giving a stronger net resultant field to which the armature conductors between the main brushes are subjected and thus cause an increased value of current to flow in the main welding circuit. In any intermediate position of the main brushes, the exciter brushes remaining fixed, the machine will be self-regulating to maintain a nearly constant current under normal welding conditions for the reasons above explained with reference to Fig. 3.

The position indicated in Fig. 4 is one of the limiting positions and the current in the welding circuit is then given its highest value. Here the main brushes and line of commutation are opposite the middle of the series poles. The resultant average field under each of the series poles then has its smallest value. Taking one-half of the armature in Fig. 4 from brush to brush, it will be seen that the resultant effect of the series poles on the armature voltage is zero, or nearly so, because one half of the armature is subjected to the influence of half a series north pole and half a series south pole, which cancel each other in resultant effect. The resultant average field under the shunt pole however, has the full effect created by the shunt field winding, because it is not only opposed by the weakest portion of the armature field, but the effect on one-half of the shunt field is additive and on the other half subtractive, which cancel each other, giving a resultant average field under the shunt pole equal to the full effect created by the shunt pole. Consequently the current generated will have the maximum value with the brushes in the position of Fig. 4.

The range of adjustment of the brushes and of the current for practical welding purposes is between the position shown in Figs. 3 and 4 and obviously gives capability of refined adjustment to any particular point desired to suit the welding requirements of any particular conditions, and gives a wide range of control. But in all these positions of the working range, the main brushes are always under the series poles and since the series poles and windings are proportioned to create a stronger field at all times than that created by the armature, there is a resultant field under the series pole for securing a proper commutating flux in all positions of brush adjustment. the series poles thus also serving as commutating poles and thereby avoiding objectionable sparking at the main brushes under all operating conditions.

There remains to consider the change in value of the field created by the shunt poles and under the different positions of adjustment of the main brushes, as caused by the change of voltage generated at the exciter brushes. Considering the conditions of Fig. 3 the voltage at the exciter brushes is obviously due to the sum of the resultant average field under a series pole and the resultant average field under a shunt pole. As already seen, the average field under the series pole has a larger value than in the case indicated in Fig. 4, and the average field under the shunt pole is considerably less than the full value of the field created by the shunt pole, because it is considerably opposed by the armature field; and the sum of the resultant fields under the shunt and series poles in the position of Fig. 3 is sufficient to cause the voltage delivered to the exciter brushes to have a comparatively large value and sufficient to give a strong excitation to the fields created by the shunt poles, as assumed in the foregoing considerations. But in the condition of Fig. 4, we have already seen that the resultant average field under the series pole is comparatively small, and that the resultant average field under the shunt pole is equal to the full value of the field created by the shunt pole and its winding. Consequently the voltage delivered from the exciter brushes under the conditions of Fig. 4 will be that due to the effect of the full strength of the shunt pole plus the effect of the small resultant field under the series pole, which sum will be greater than the sum of the reduced resultant average values under the conditions of Fig. 3. Consequently the voltage generated at the exciter brushes under the conditions of Fig. 4 will be somewhat higher than that under the conditions of Fig. 3. Thus in passing from the main brush position of Fig. 3 to that of Fig. 4, the strength of the field created by the shunt windings will have a gradually increasing effect, which is desirable in aiding to bring about the increased current output in adjusting the main brushes in the direction stated. Thus the change in strength of the field created by the shunt poles is beneficial in securing the results desired, but it is of course to be understood that the main controlling effect in this respect is due to the conditions already explained with reference to the changes considered in regard to the average field strengths under the poles as effecting the voltage delivered at the main brushes.

In the above explanations the effects of leakage and distortion of the flux and other modifying considerations have not been taken into account, but these are comparatively unimportant in affecting the general results as referred to by the above explanations of operation. This general explanation of operation is therefore sufficient for showing the main controlling features and general theory of operation.

It will also be understood that the field and armature windings and the relative field strengths may be proportioned to suit particular requirements without departing from the scope of this invention, and that modifications may be made from the preferred form of my invention, above explained, without departing from the scope of the claims. In some cases it may be desirable to excite the shunt windings from an outside source, or in other ways cause the field created by the shunt poles to be of constant value, or nearly constant value, and satisfactory results may thus be obtained without however, obtaining the full advantage of my invention. A greater number of poles than shown in Figs. 3 and 4 may of course be used provided the above described relationship is retained. The series poles are preferably of substantially the same size as the shunt poles and should be nearly the same size in order to obtain a wide range of adjustment of the working current and to secure stable operating conditions.

I claim:—

1. A dynamo electric machine comprising main poles having shunt windings, main poles having series windings, said poles being angularly displaced from each other and each of the series wound poles being located between shunt wound poles, and each of the poles having a polarity the same as one adjacent pole and of opposite polarity to the other adjacent pole, and main brushes located to have the line of commutation opposite the series poles.

2. A dynamo electric machine comprising main poles having shunt windings, main poles having series windings, said poles being angularly displaced from each other and each of the series wound poles being located between shunt wound poles, and each of the poles having a polarity the same as one adjacent pole and of opposite polarity to the other adjacent pole, main brushes located to have the line of commutation opposite the series poles, and means for shifting the main brushes to adjust the line of commutation to different positions opposite the series poles.

3. A dynamo electric machine comprising poles having shunt windings, poles having series windings, said poles being angularly displaced from each other and each of the series wound poles being located between shunt wound poles, and each of the poles having a polarity the same as one adjacent pole and of opposite polarity to the other adjacent pole, main brushes located to have the line of commutation under the series wound poles, and exciter brushes for said shunt windings located to have the line of commutation between poles of opposite polarity.

4. A dynamo electric machine comprising poles having shunt windings, poles having series windings, said poles being angularly displaced from each other and each of the series wound poles being located between shunt wound poles, and each of the poles having a polarity the same as one adjacent pole and of opposite polarity to the other adjacent pole, main brushes located to have the line of commutation under the series wound poles, exciter brushes for said shunt windings being located to have the line of commutation between poles of opposite polarity, and means for shifting the main brushes to cause the line of commutation to be shifted to different positions opposite the series wound poles.

5. A dynamo electric machine comprising main poles having shunt windings, main poles having series windings, said poles being angularly displaced from each other and each of the series wound poles being located between shunt wound poles, and each of the poles having a polarity the same as one adjacent pole and of opposite polarity to the other adjacent pole, the field created by the series poles being stronger than the field created by the armature, and main brushes located to have the line of commutation opposite the series poles.

6. A dynamo electric machine comprising main poles having shunt windings, main poles having series windings, said poles being angularly displaced from each other and each of the series wound poles being located between shunt wound poles, and each of the poles having a polarity the same as one adjacent pole and of opposite polarity to the other adjacent pole, the field created by the series poles being stronger than the field created by the armature, main brushes located to have the line of commutation opposite the series poles, and means for shifting the main brushes to adjust the line of commutation to different positions opposite the series poles.

7. A dynamo electric machine comprising poles having shunt windings, poles having series windings, said poles being angularly displaced from each other and each of the series wound poles being located between shunt wound poles, and each of the poles having a polarity the same as one adjacent pole and of opposite polarity to the other adjacent pole, the field created by the series poles being stronger than the field created by the armature, the main brushes being located to cause the line of commutation to be opposite the series poles, and exciter brushes for said shunt windings being located to have the line of commutation between poles of opposite polarity.

8. A dynamo electric machine comprising poles having shunt windings, poles having series windings, said poles being angularly displaced from each other and each of the series wound poles being located between shunt wound poles, and each of the poles having a polarity the same as one adjacent pole and of opposite polarity to the other adjacent pole, all of said poles being of substantially the same size, and means for shifting the main brushes to adjust the line of commutation over a wide range opposite the series poles.

9. A dynamo electric machine comprising poles having shunt windings, poles having series windings, said poles being angularly displaced from each other and each of the series wound poles being located between shunt wound poles, and each of the poles having a polarity the same as one adjacent pole and of opposite polarity to the other adjacent pole, all of said poles being of substantially the same size, main brushes located to have the line of commutation under the series wound poles, and exciter brushes for said shunt windings located to have the line of commutation between poles of opposite polarity.

10. A dynamo electric machine comprising poles having shunt windings, poles having series windings, said poles being angularly displaced from each other and each of the series wound poles being located between shunt wound poles, and each of the poles having a polarity the same as one adjacent pole and of opposite polarity to the other adjacent pole, all of said poles being of substantially the same size, main brushes located to have the line of commutation under the series wound poles, exciter brushes for said shunt windings being located to have the line of commutation between poles of opposite polarity, and means for shifting the main brushes to cause the line of commutation to be shifted to different positions opposite the series wound poles.

11. A dynamo electric machine comprising poles having shunt windings, poles having series windings, said poles being angularly displaced from each other and each of the series wound poles being located between shunt wound poles, and each of the poles having a polarity the same as one adjacent pole and of opposite polarity to the other adjacent pole, all of said poles being of substantially the same size, the field created by the series poles being stronger than the field created by the armature, and main brushes located to have the line of commutation opposite the series poles.

12. A dynamo electric machine comprising poles having shunt windings, poles having series windings, said poles being angularly displaced from each other and each of the series wound poles being located between shunt wound poles, and each of the poles having a polarity the same as one adjacent pole and of opposite polarity to the other adjacent pole, all of said poles being of substantially the same size, the field created by the series poles being stronger than the field created by the armature, main brushes located to have the line of commutation opposite the series poles, and means for shifting the main brushes to adjust the line of commutation to different positions opposite the series poles.

13. A dynamo electric machine comprising poles having shunt windings, poles having series windings, said poles being angularly displaced from each other and each of the series wound poles being located between shunt wound poles, and each of the poles having a polarity the same as one adjacent pole and of opposite polarity to the other adjacent pole, all of said poles being of substantially the same size, the field created by the series poles being stronger than the field created by the armature, the main brushes being located to cause the line of commutation to be opposite the series poles, and exciter brushes for said shunt windings being located to have the line of commutation between poles of opposite polarity.

JAMES BURKE.